United States Patent [19]

Merlino et al.

[11] 4,453,113
[45] Jun. 5, 1984

[54] REGENERATIVE BRAKE CONTROL FOR TRANSIT VEHICLE

[75] Inventors: Paul J. Merlino, West Newton, Pa.; Kevin J. Reilly, San Ramon, Calif.

[73] Assignee: Westinghouse Electric Corp., Pittsburgh, Pa.

[21] Appl. No.: 473,514

[22] Filed: Mar. 9, 1983

[51] Int. Cl.³ .............................................. H02P 3/14
[52] U.S. Cl. .................................. 318/376; 318/269; 318/273; 318/302
[58] Field of Search ............... 318/376, 378, 269, 273, 318/370, 302, 363; 364/426

[56] References Cited

U.S. PATENT DOCUMENTS

4,042,865  8/1977  Gurwicz ............................ 318/269

Primary Examiner—G. Z. Rubinson
Assistant Examiner—Bentsu Ro
Attorney, Agent, or Firm—R. G. Brodahl

[57] ABSTRACT

There is disclosed apparatus for controlling the regenerative brake operation of a transit vehicle, in relation to the polarity condition of coupled power lines having an insulator gap, by sensing that the power lines are successively supplying in relation to at least one predetermined time period, established in accordance with the vehicle travel time across that gap, a desired line voltage to the propulsion motor of the vehicle.

10 Claims, 10 Drawing Figures

REGENERATIVE BRAKE CONTROL FOR TRANSIT VEHICLE

BACKGROUND OF THE INVENTION

It is known in the prior art to energize the propulsion equipment of a transit vehicle from a power source, and to provide a regenerative braking operation with a passenger vehicle, as described in an article entitled "Alternative Systems for Rapid Transit Propulsion and Electrical Braking" by B. J. Krings which appeared in the Westinghouse Engineering for March, 1973, at pages 34 to 41.

It is known in the prior art to sense when a vehicle is positioned within a gap in a third rail power supply, and to sense the current supplied to auxiliary devices carried by the vehicle for determining when regenerating current is permitted to go back to the power line as described in U.S. Pat. No. 4,326,154 of R. R. Lewis et al.

It is known in the prior art to provide a direct current motor control apparatus for determining the operational speed of one or more direct current motors, such as traction motors propelling a passenger vehicle along a track, and to utilize solid state switch devices to determine one of a propulsion or brake mode of operation of the motor control apparatus as disclosed in U.S. Pat. No. 4,284,930 of T. C. Matty.

SUMMARY OF THE INVENTION

The present invention controls the regenerative brake operation of a trolley bus vehicle. The typical power supply lines for a trolley bus vehicle are respectively at about +300 volts and −300 volts, for a 600 volt total difference between the lines. As the vehicle moves along a roadway, each of the two trolley poles carried by the vehicle can couple with either plus or minus supply lines. The power supply lines are provided in a plurality of sections energized by different power stations, and a particular section of track can be reversed in polarity for some reason such as in relation to a switch for a branching roadway. For regenerative brake operation of the trolley vehicle, it is important that a particular polarity of current be supplied back into the power lines. A determination is made to see if the supply lines have the desired polarity before regeneration is permitted, and this is done by monitoring the input voltage to the trolley vehicle from the supply lines. As long as this input voltage polarity is sensed to be proper, then regenerative braking is permitted.

DESCRIPTION OF THE PREFERRED EMBODIMENT

Figure 1:
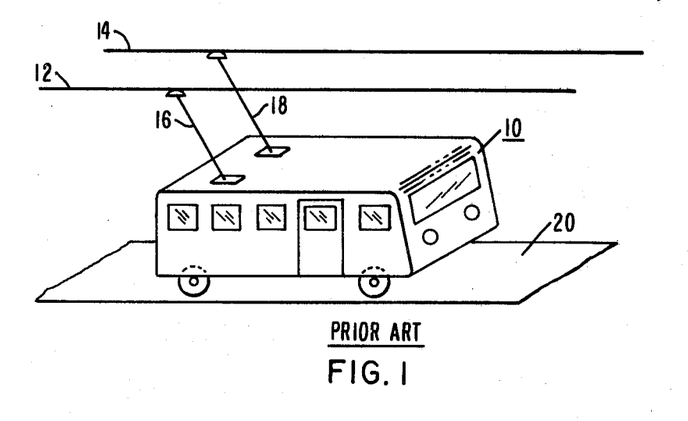
FIG. 1 shows a prior art trolley bus operative with the trolley wires of a power supply line.

In FIG. 1, there is shown a prior art trolley bus 10 operative with power supply lines 12 and 14 as coupled through trolley poles 16 and 18 to energize the movement of the vehicle along a roadway track 20.

Figure 2:
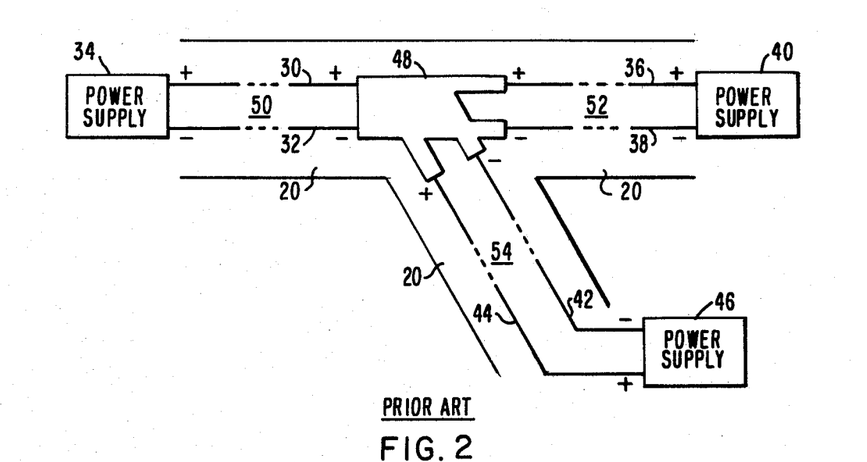
FIG. 2 shows a prior art power supply line switching arrangement for a trolley bus application.

In FIG. 2, there is shown a well known prior art power line switch arrangement for energizing a first pair of power lines 30 and 32 from a power supply 34, a second pair of power supply lines 36 and 38 by a power supply 40 and a third pair of power supply lines 42 and 44 by a power supply 46. An insulator member 48 is coupled between the power supply lines 30, 32, 36 and 38 for a vehicle moving from a first roadway 50 to a second roadway 52. In addition, the insulator member 48 couples between the power lines 30, 32, 42 and 44 to permit the vehicle moving from the first roadway 50 onto a third roadway 54, if desired. It should be noted that as the vehicle moves from the first roadway 50 onto the third roadway 54, the polarity arrangement of the respective power lines energizing the vehicle has reversed whereas the polarity arrangement is the same for a vehicle moving from the roadway 50 onto the second roadway 52.

Figure 3:
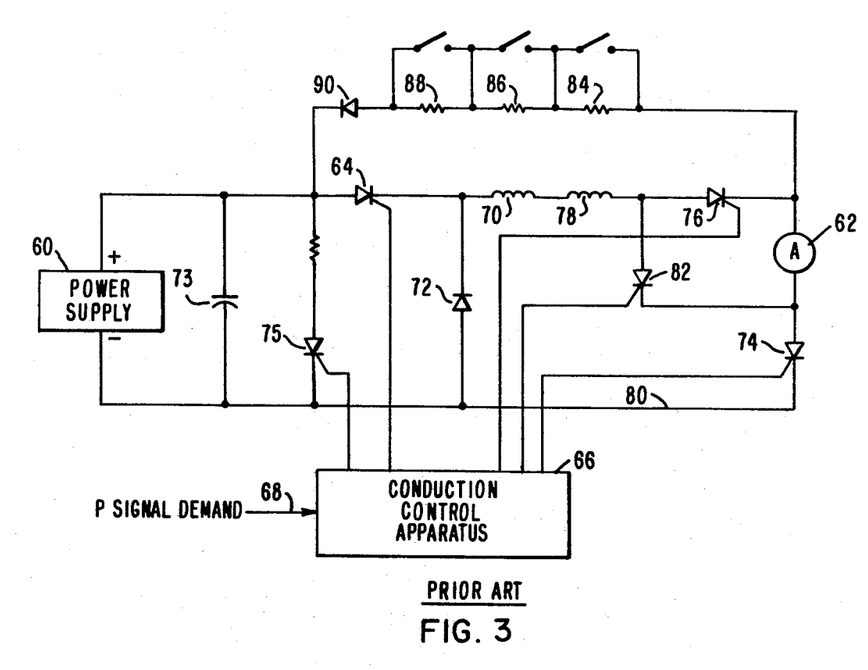
FIG. 3 shows a prior art motor control apparatus which enables regeneration of current into the power supply during a braking operation of a passenger vehicle.

In FIG. 3, there is shown a prior art propulsion motor control apparatus, as disclosed in U.S. Pat. No. 4,284,930, which is carried by a transit vehicle to enable regeneration of current into the power supply during a braking operation of a passenger vehicle. A direct current power supply 60 of indicated polarity is connected to a direct current motor generator including armature 62 and through a series main thyristor switch device 64 that repetitively operates in an ON condition and an OFF condition to chop and regulate the voltage applied to the motor load 62. The control of this voltage is determined by changing the ON time in relation to the OFF time of the conduction by the main thyristor 64 for controlling the torque of the motor generator 62. The main thyristor switch 64 is gated by a conventional conduction control apparatus 66 in response to the P signal effort request 68 to close and become conductive and then is subsequently commutated to open and become not conductive as required to provide a desired average voltage across the motor armature 62 to determine the motor torque. The motor current increases each time the thyristor switch 64 becomes conductive and then decreases each time the thyristor switch 64 blocks. The average motor current 22 is proportional to the torque of the motor.

The power thyristor switches 74 and 76 are made conductive when it is desired for the motor circuit to operate in the power or acceleration mode for the propulsion of the vehicle coupled with the motor armature 62. A motor field winding 78 is connected in the power mode circuit including the power thyristor switches 74 and 76, the return conductor 80, the power supply 60, the main thyristor switch 64 and the motor reactor 70. A brake thyristor switch 82 is made conductive when it is desired for the motor circuit to become operative in the brake or deceleration mode circuit, which includes the motor armature 62, the brake resistors 84, 86 and 88, the brake diode 90, the main thyristor switch 64, the motor reactor 70 and the motor field 78.

In the brake mode with the main thyristor 64 not conducting, the current will flow through a circuit including the power supply 60, a free wheeling diode 72, the motor reactor 70, the motor field 78, the brake thyristor 82, the motor armature 62 and any of the resistors 84, 86 and 88 that are not short circuited and through the brake dioe 90 to regenerate power back to the power supply 60.

Figure 4:
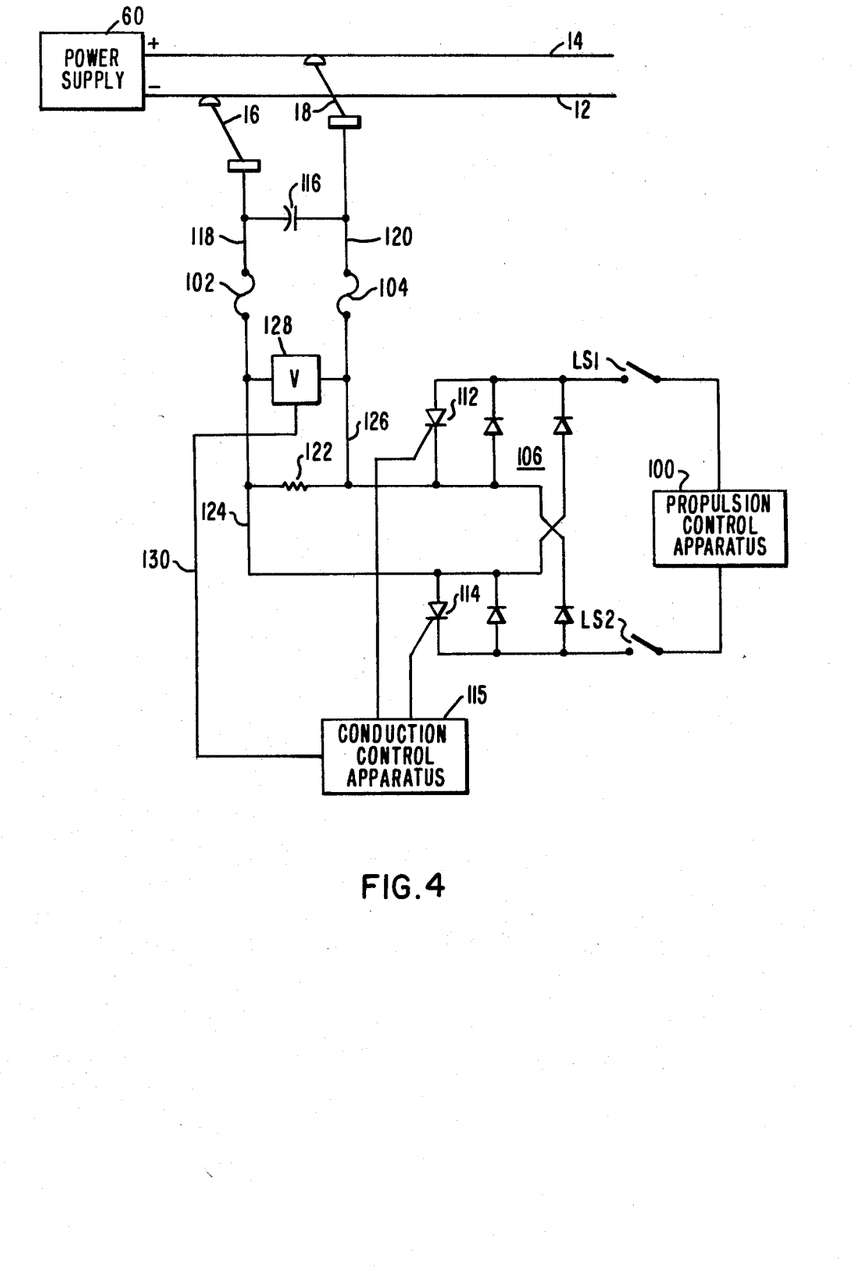
FIG. 4 shows the power regeneration control apparatus of the present invention.

In FIG. 4, there is shown the power regeneration control apparatus of the present invention. The propulsion control apparatus 100 can correspond with the propulsion motor control apparatus as shown in FIG. 3. The trolley poles 16 and 18 are electrically coupled with power lines 12 and 14 to supply current to the propulsion motor within the propulsion control apparatus 100 through line fuses 102 and 104 and a diode bridge 106 and line switches LS1 and LS2. Included are regenerative current control thyristors 112 and 114 that are controlled by the conduction control apparatus 115 to turn ON when the polarity condition of the power supply lines 12 and 14 is such that the power line 12 is negative and the power line 14 is positive. A lightning arrestor capacitor 116 is connected between the conductors 118 and 120 and a resistor 122 is connected between the conductors 124 and 126. A voltage sensing device 128 is connected in parallel with the resistor 122 for providing a voltage signal 130 to the conduction control apparatus 115 in accordance with the voltage across the resistor 122.

Figure 5:
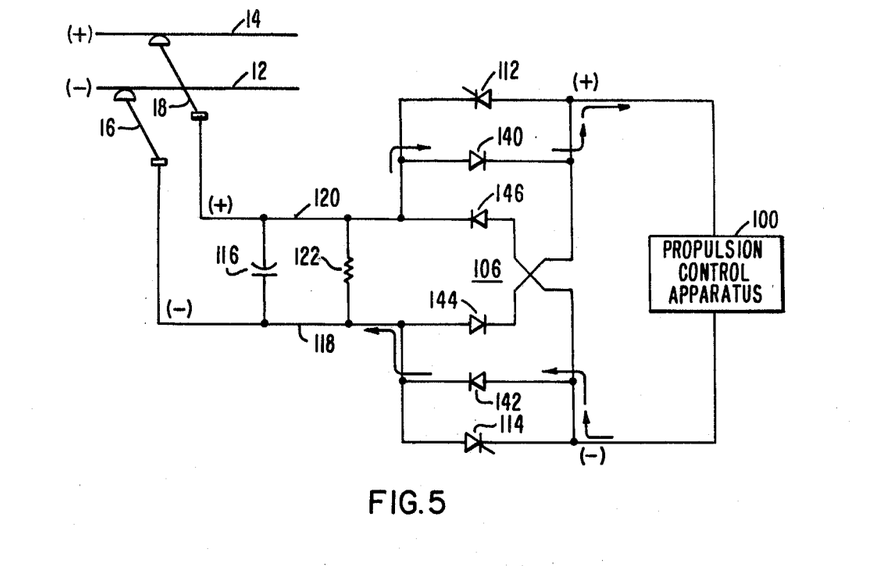
FIG. 5 shows the current flow path in relation to the propulsion apparatus for a first polarity condition of the power supply lines.

In FIG. 5, there is shown the current flow path to the propulsion control apparatus 100 through the control apparatus of the present invention and for a first polarity condition of the power supply lines when the power line 14 is positive and the power line 12 is negative. The current flows from the power line 14 and the input conductor 120 through the diode 140 in the diode bridge 106 to the propulsion control apparatus 100 and then back through the diode 142 to the input conductor 118 and back to the power line 12.

Figure 6:
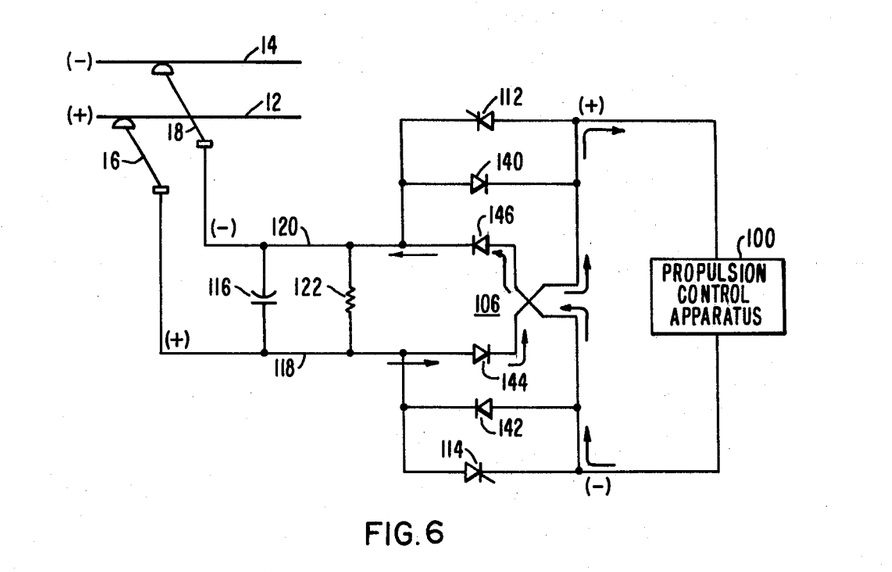
FIG. 6 shows the current flow path in relation to the propulsion apparatus for a second polarity condition of the power supply lines.

In FIG. 6, there is shown the current flow path through the control apparatus of the present invention and to the propulsion control aparatus 100 for a second polarity condition of the power lines when the power line 14 is negative and the power line 12 is positive. The current flows from the power line 12 through the input conductor 118 and through the diode 144 of the diode bridge 106 to the propulsion control apparatus 100 and returns through the diode 146 to the input conductor 120 and the negative polarity power line 14.

Figure 7:
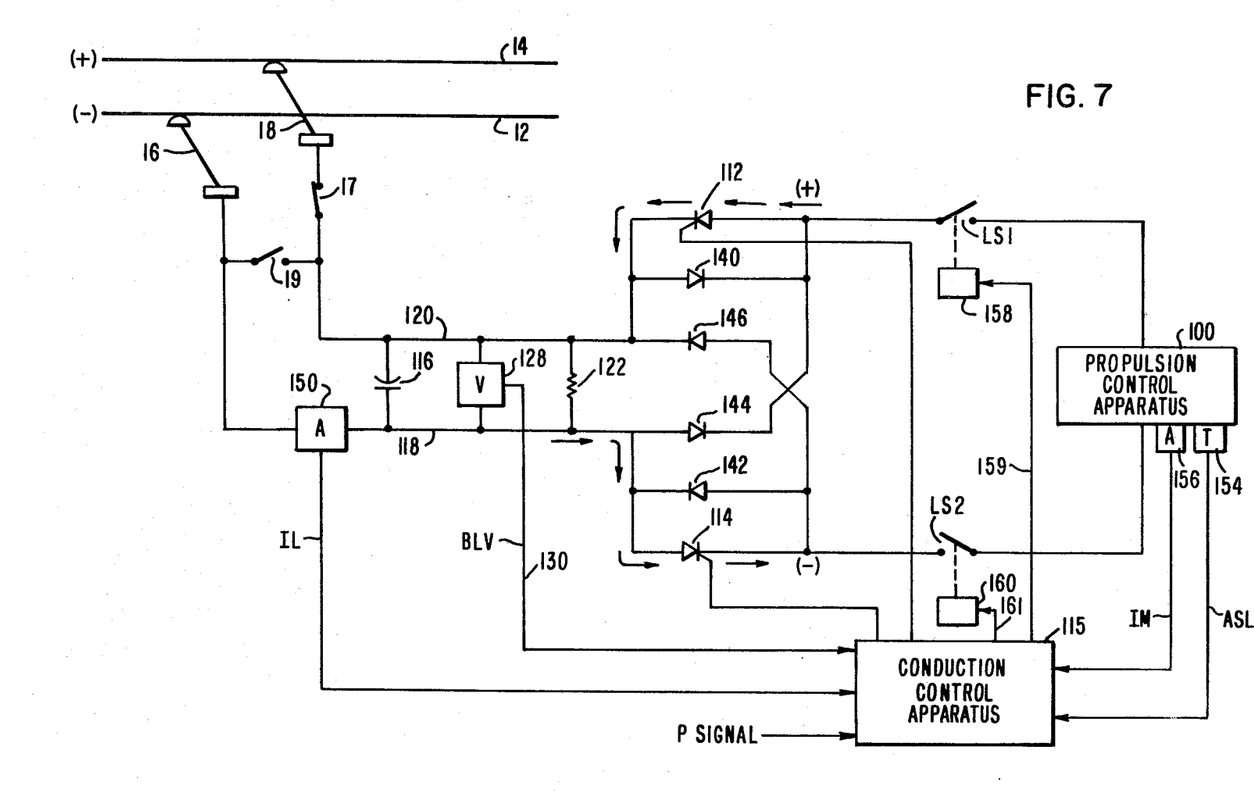
FIG. 7 illustrates the regenerative braking operation of the passenger vehicle in accordance with the present invention.

In FIG. 7, there is shown the current flow path during regenerative braking of the vehicle propulsion motor within the propulsion control apparatus 100. The thyristor 112 and the thyristor 114 are turned ON for this regenerative braking. The brake current from the motor armature 62 as shown in FIG. 3 and within the propulsion control apparatus 100 flows through the thyristor 112 and the input conductor 120 to the power line 14 and the power supply and then from the power line 12 through the input conductor 118, through the thyristor 114 back to the motor armature 62 within the propulsion control apparatus 100. The conduction control apparatus 115 determines the ON operation of the thyristors 112 and 114 in response to the input voltage signal 130 from across the input R-C circuit including the capacitor 116 and resistor 122. The conduction control apparatus 115 is responsive to the line current IL from a current sensor 150, the line voltage BLV from the voltage sensor 128, the vehicle speed ASL from a tachometer 154 coupled with the propulsion motor and the motor current IM provided by a current sensor 156 operative with the motor armature. The closed position of the line switch LS1 is determined by a position control device 158 and the closed position of the line switch LS2 is determined by a position control device 160, in response to respective control signals 159 and 161 from the condition control apparatus 115. The conduction control apparatus 115 can include an Intel 8080 microprocessor operated with the control program shown in the Appendix.

Figures 8, 10:
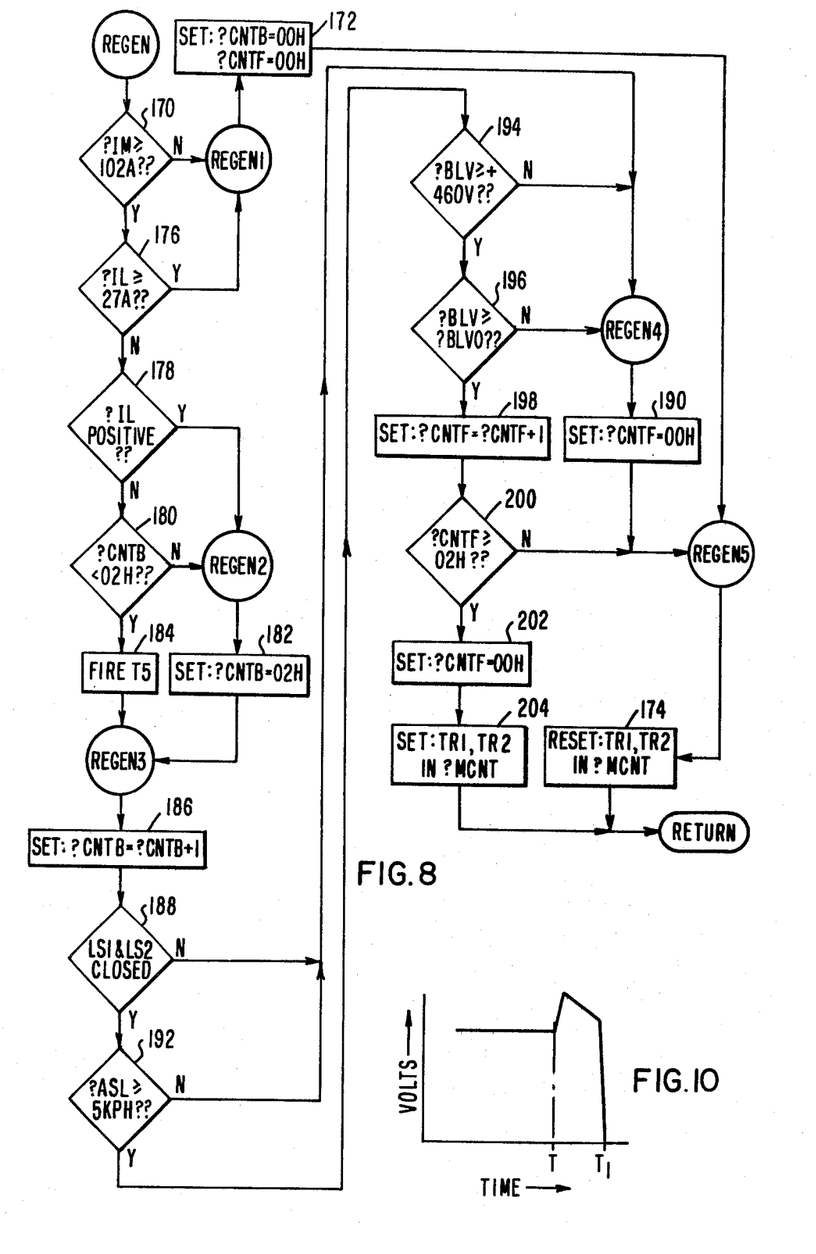
FIG. 8 shows a functional flow chart of the control program operative with the conduction control apparatus shown in FIG. 4.
FIG. 10 shows an enlargement of the line voltage curve shown in FIG. 9, for the curve portion adjacent to the time T.

In FIG. 8, there is shown a functional flow chart of the control program operative with the conduction control apparatus 115 shown in FIG. 7. The computer cycles on a 218 hertz time base, so about every 4.6 milliseconds a sample of the data is taken. At block 170, a determination is made to see if the sampled motor current IM is equal to or greater than 102 amperes, which is desired for proper regeneration of power back to the power lines. If not, the program goes to block 172 where the B and F counters are set to zero and goes to block 174 where thyristors 112 and 114 are reset in their OFF condition of non-conduction to not regenerate in the brake mode. If the motor current IM is equal to or greater than 102 amperes at block 170, a check is made at block 176 to see if the line current IL is equal to or greater than 27 amperes, which is only about seven bits of data in the microprocessor and any smaller current might be unreliable in relation to noise. If the line current is greater than 27 amperes and is already going out to the power lines, the thyristors 112 and 114 have to already be ON and conducting so there is no need to fire them ON, and if this current is coming in to the trolley bus, the thyristors 112 and 114 will not turn ON even if they are fired. If the line current IL is smaller than 27 amperes at block 176, then at block 178 a check is made to see if the line current IL is positive as shown in FIG. 7, and if it is positive, the B counter is set to two at block 182. If the line current IL is not positive at block 178, then at block 180 a check is made to see if the B counter is less than two, and if not, at block 182 the B counter is set to two. If desired, the dynamic brake T5 thyristor 75 shown in FIG. 3 and within the propulsion control apparatus 100 can be fired ON at block 184 to pull current through the diodes 140 and 142 to reverse bias the thyristors 112 and 114 when there is some help needed to turn OFF the latter thyristors. At block 186 the B counter is incremented by one. At block 188 a check is made to see if the line switches LS1 and LS2 are closed. If they are not closed, regeneration is not desired so the program goes to block 190 where the counter is set to zero and to the block 174 where the thyristors 112 and 114 are not fired and then returns. If the line switches are closed at block 188, then at block 192 a check is made to see if the vehicle speed ASL is equal to or greater than 5 KPH. If not and since there is probably not enough energy at low speed left in the vehicle system for regenerative braking, the program goes to block 190 to set the F counter to zero and the thyristors are not fired. If the vehicle speed is equal to or greater than 5 KPH, at block 194 a check is made to see if the line voltage is equal to or greater than positive 460 volts. If not positive then regeneration is not desired and if not at least 460 volts such an operation presents problems for the motor circuits, so the counter is set to zero at block 190 and the thyristors are not fired. If the line voltage is equal to or greater than +460 volts at block 194, then at block 196 a check is made to see if the present line voltage BLV is equal to or greater than the previous line voltage BLVO for the previous cycle of the computer. If not, at block 190 the counter is set to zero and the thyristors are not fired, and if yes, at block 198 the F counter is incremented by one. At block 200 a check is made to see if the F counter is equal to or greater than 2, since it is desired that the sensed conditions be present for at least two consecutive times through the control program. When any of these conditions is not satisfactory, the F counter is reset to zero. If not equal to or greater than 2 at block 200, then the program goes to block 174 and the thyristors are not fired. If the F counter is equal to or greater than 2, at block 202 the F counter is reset to zero, and at block 204 the thyristors 112 and 114 are fired to turn ON and be conductive for the regenerative brake operation.

Since the input conductors 118 and 120 can see a reverse polarity condition or even an actual shorting together of the pole couplings 16 and 18 after the pole couplings transverse an insulator gap of about 18 inches, it is desired that the thyristors 112 and 114 are not fired and turn OFF before the vehicle arrives at the other side of the insulator gap. At a vehicle speed of 95.5 KPH, it takes the pole couplings 16 and 18 approximately 17 milliseconds to travel the insulator gap length of 18 inches. By successively monitoring the line voltage BLV each computer cycle, a determination can be made that the trolley pole couplings 16 and 18 are in the gap of the power lines and on an insulator member 48 as shown in FIG. 2 or are disconnected from the overhead power lines. If the couplings are not in the insulator gap, the line voltage BLV will be normally varying up and down. Therefore, if the line voltage rises or is equal for two consecutive cycles of approximately 4.6 milliseconds per microprocessor cycle and the other checked parameters are satisfied as shown in FIG. 8, the line polarity is determined to be normal as shown in FIG. 7 and a determination made that the vehicle couplings 16 and 18 are not in an insulator gap 48 and it is permissible to fire the thyristors 112 and 114 at block 204 of FIG. 8 to enable regenerative braking of the vehicle in the brake mode of operation. If the vehicle pole couplings 16 and 18 are in a gap or are disconnected from the overhead power lines, the voltage will be decreasing because of the current decay through the resistor 122 in the RC circuit including the charged capacitor 116 and it is desired to not fire the thyristors 112 and 114. To make sure that the thyristors 112 and 114 turn OFF when the couplings 16 and 18 are in an insulator gap, the lightning arrester capacitor 116 is provided. If the vehicle is regenerating and the thyristors 112 and 114 are turned ON, the current is then flowing through the thyristor 112 and flowing out into the power line 14. When the couplings 16 and 18 come to an insulator gap in the power lines, the power lines 12 and 14 are now in an open circuit condition and the current that was flowing out into the power lines 12 and 14 therefore stops flowing to cause an arcing at the pole tip couplings and to increase the voltage across the lightning arrester capacitor 116 as compared to the voltage across the line filter capacitors, such as the line filter capacitor 73 shown in FIG. 3. The thyristors 112 and 114 turn OFF because the current through those thyristors 112 and 114 goes to zero and the current rings back through the diodes 140 and 142 putting a reverse bias on the thyristors 112 and 114, because the lightning arrestor capacitor 116 is at a higher voltage than the voltage of the filter capacitor 73. With the thyristors 112 and 114 turned OFF, the voltage of the lightning arrester capacitor 116 will decay through the resistor 122 in accordance with the RC time constant of that circuit and the line voltage signal 130 will prevent the firing ON of the thyristors 112 and 114. After the couplings 16 and 18 move across the insulator gap, the line voltage BLV will come back and permit a regenerative braking operation again, if the polarity of the power lines is normal with the power line 14 positive and the power line 12 negative.

For one actual embodiment of the present invention that was built and tested, the capacitor 116 had a value of 4 microfarads and the resistor 122 had a value of 20 Kohms.

Figure 9:
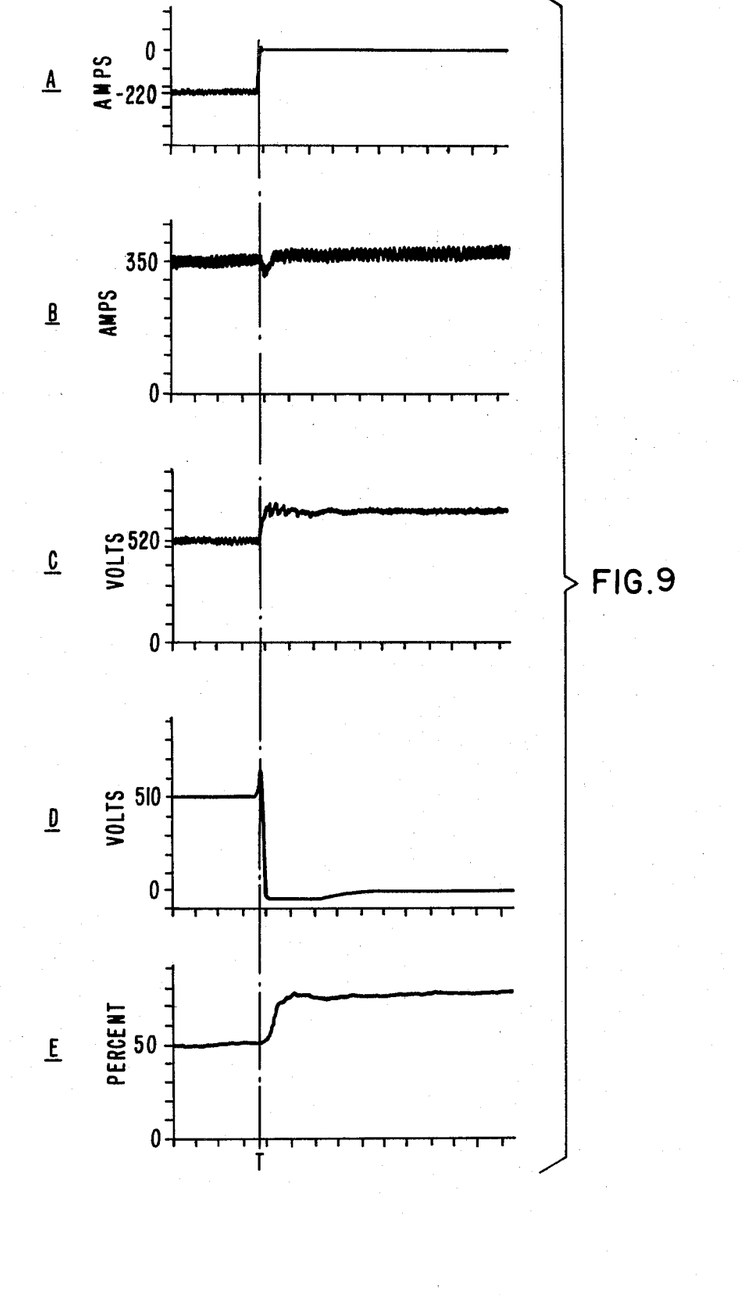
FIG. 9 shows a plurality of curves to illustrate the operational relationships in accordance with the present invention between the line current, the motor current, the filter capacitor voltage, the line voltage and the phase angle of the propulsion chopper thyristor switch, when a power line first test switch is opened and then after a few milliseconds a second test switch is closed to represent the power lines becoming together shorted to simulate a vehicle movement through a power line switch including an insulator member followed by subsequently the trolley poles shorting together.

In FIG. 9A there is shown the line current having a value of minus 220 amperes until time T, when the trolley pole coupling 18 is effectively disconnected from the power line 14 and the line current goes to zero.

In FIG. 9B there is shown the motor current, which at time T is disturbed when the trolley pole coupling 18 is effectively disconnected from the power line 14, and then the power line is effectively shorted to simulate the trolley poles shorting together.

In FIG. 9C there is shown the voltage across the filter capacitors 73 shown in FIG. 3, at time T to result in an increase in voltage across these capacitors followed by the power lines being shorted.

In FIG. 9D there is shown the line voltage which momentarily rises at time T and then falls off as the capacitor 116 discharges through the resistor 122 until the power lines are shorted together.

In FIG. 9E there is shown the phase angle setting of the chopper thyristor 64 in response to the opening of the line at time T followed by shorting of the input power lines.

The voltage curve shown in FIG. 10 is an enlargement of the voltage curve shown in FIG. 9 in relation to the time T, and was in practice obtained by providing a first test switch 17 in series with one trolley pole, such as trolley pole 18, as shown in FIG. 7 and by providing a second test switch 19 connected between the trolley poles 16 and 18. The first switch 17 is normally closed and was opened at time T shown in FIG. 10 to represent the trolley pole 18 being physically positioned within the insulator member 48 shown in FIG. 2. The second switch 19 is normally open and was closed at time T1 subsequent to time T as shown in FIG. 10 to represent the trolley poles 16 and 18 becoming shorted together. At time T the switch 17 was opened, to cause the voltage to shoot up until the RC time constant starts to discharge this voltge. Then at time T1, about 6 milliseconds later, the switch 19 was closed to short the trolley poles 16 and 18 together and bring the line voltage to zero. The RC time constant for a resistor 122 of 20 ohmes and a capacitor 116 of 4 microfarads is 80 milliseconds.

In the Appendix there is included a program listing that has been prepared to provide the regenerative brake control operation of the here disclosed control program as shown in the flow chart of FIG. 8. The instruction program listing is written in the assembly language of the Intel 8080 microprocessor. Many of these microprocessors have already been supplied to customers, including technical instruction manuals and descriptive documentation to explain to persons skilled in this art the operation of the microprocessor apparatus. This program listing is included to provide an illustration of one suitable embodiment of the present invention that has been developed. This instruction program listing at the present time is a more or less development program and has not been extensively debugged through the course of extensive practical operation for the real time control of a regenerative brake operation. It is well known by persons skilled in this art that most real time control application programs contain some bugs or minor errors, and it usually takes varying periods of actual operation time for persons skilled in this art to identify and routinely correct the more critical of these bugs.

```
3200 0 ;****************************************
3210 0 ;REGENERATION (REGEN) ROUTINE
3220 0 ;MERLINO    09/03/81
3230 0 ;VANCOUVER TROLLEY BUS
3240 0 ;****************************************
3250 0
32520 REGEN:  LDA   ?IM          ;GET: ?IM
32540         CPI   1AH          ;IS: ?IM >= 102 AMPS ??
32550         JC    REGEN1       ;NO, JUMP TO: REGEN1
32560         LDA   ?IL          ;YES, GET: ?IL
32700         CPI   07H          ;IS: ?IL >= 27 AMPS ??
32800         JNC   REGEN1       ;YES, JUMP TO: REGEN1
32810         LDA   ?IDIR        ;NO, GET: ?IDIR
32820         ANI   02H          ;IS: ?IL POSITIVE (IN) ??
32830         JNZ   REGEN2       ;YES, JUMP TO: REGEN2
32900         LDA   ?CNTB        ;NO, GET: ?CNTB
33000         CPI   02H          ;IS: ?CNTB < 02H ??
33100         JNC   REGEN2       ;NO, JUMP TO: REGEN2
33200         MOV   A,C          ;YES, GET: ?ACNT
33300         ORI   00H          ;SET: TS IMM. IN ?ACNT
33400         MOV   C,A          ;STORE: ?ACNT
33500 REGEN3: LDA   ?CNTB        ;GET: ?CNTB
33600         INR   A            ;
33700         STA   ?CNTB        ;SET: ?CNTB = ?CNTB + 1
33710         LDA   ?FDBK        ;GET: ?FDBK
33720         ANI   18H          ;
33730         CPI   18H          ;ARE: LS1 AND LS2 CLOSED ??
33740         JNZ   REGEN4       ;NO, JUMP TO: REGEN4
33750         LDA   ?ASL         ;YES, GET: ?ASL
33760         CPI   38H          ;IS: ?ASL >= 5 KPH ??
33770         JC    REGEN4       ;NO, JUMP TO: REGEN4
33800         LDA   ?IDIR        ;YES, GET: ?IDIR
33900         ANI   08H          ;IS: ?BLV VOLTAGE POSITIVE ??
34000         JZ    REGEN4       ;NO, JUMP TO: REGEN4
34100         LDA   ?BLV         ;YES, GET: ?BLV
34200         CPI   75H          ;IS: ?BLV >= 460 VOLTS ??
34300         JC    REGEN4       ;NO, JUMP TO: REGEN4
34400         LXI   H,?BLVO      ;YES, SET: REG. M = ?BLVO
34500         CMP   M            ;IS: ?BLV >= ?BLVO ??

34600         JC    REGEN4       ;NO, JUMP TO: REGEN4
34700         LDA   ?CNTF        ;YES, GET: ?CNTF
34800         INR   A            ;
34900         STA   ?CNTF        ;SET: ?CNTF = ?CNTF + 1
35000         CPI   02H          ;IS: ?CNTF >= 02H
35100         JC    REGEN5       ;NO, JUMP TO: REGEN5
35200         XRA   A            ;YES,
35300         STA   ?CNTF        ;SET: ?CNTF = 00H
35400         LDA   ?MCNT        ;GET: ?MCNT
35500         ORI   0C0H         ;SET: TR1,TR2 IN ?MCNT
35600         STA   ?MCNT        ;STORE: ?MCNT
35700         RET                ;RETURN
35800                            ;
35900 REGEN1: XRA   A            ;
36000         STA   ?CNTB        ;SET: ?CNTB = 00H
36100         STA   ?CNTF        ;SET: ?CNTF = 00H
36200 REGEN5: LDA   ?MCNT        ;GET: ?MCNT
36300         ANI   3FH          ;RESET: TR1,TR2 IN ?MCNT
```

```
364400            STA   ?MCNT   ;STORE: ?MCNT
365000            RET           ;RETURN
366400                          ;
367000 REGEN4:    XRA   A       ;
368000            STA   ?CNTF   ;SET: ?CNTF = 00H
369000            JMP   REGEN5  ;JUMP TO: REGEN5
370000                          ;
371000 REGEN2:    MVI   A,20H   ;
372000            STA   ?CNTB   ;SET: ?CNTB = 20H
373000            JMP   REGEN3  ;JUMP TO: REGEN3
374000            END
```

We claim:

1. In regenerative braking control apparatus for a moving vehicle having a propulsion motor operative in a brake mode and coupled with power supply lines providing first and second polarity conditions, the combination of:

means for sensing a first voltage of said power lines and after a predetermined time period sensing a second voltage of said power lines, means for determining that said first polarity condition exists and that the second voltage is one of equal to or greater than the first voltage, and means for connecting the propulsion motor to said power lines when said first polarity condition is provided during said brake mode and the second voltage is one of equal to or greater than the first voltage.

2. The control apparatus of claim 1 with the power lines including an insulator gap, with said predetermined time period being less than the travel time of said vehicle moving across said gap.

3. The control apparatus of claim 1 including, means for sensing the line current flowing between the power lines and the motor, with said motor connecting means being operative with the current sensing means and responsive to the line current being greater than a predetermined current before the propulsion motor is connected to the power lines during said brake mode.

4. The control apparatus of claim 1 including, means for sensing the movement speed of the vehicle, with said motor connecting means being operative with the speed sensing means and responsive to the vehicle speed being greater than a predetermined speed before the propulsion motor is connected to the power lines during said brake mode.

5. The control apparatus of claim 1, with said motor connecting means being operative with the polarity condition determining means and responsive to the each of the sensed first and second voltages being greater than a predetermined voltage before the propulsion motor is connected to the power lines during said brake mode.

6. In regenerative braking control apparatus for a moving vehicle having a motor operative in a brake mode and coupled with a power supply providing first and second polarity voltage energizations of said motor means sensing a first voltage energization of the motor and subsequently sensing a second voltage energization of the motor, means for establishing that a first polarity voltage energization of said motor is provided in accordance with a predetermined relationships between the sensed first and second voltage energizations of the motor, means operative with the vehicle for establishing that the actual movement speed of the vehicle is greater than a predetermined vehicle speed, and means operative with the polarity establishing means for enabling the regenerative braking operation of the motor with said power supply when said first polarity voltage energization is established and in response to the actual speed of the vehicle being greater than said predetermined speed.

7. The control apparatus of claim 6, including means for establishing that the motor current is greater than a predetermined current, with said enabling means being responsive to the motor current being greater than said predetermined current.

8. The control apparatus of claim 6 coupled through line switches with the power supply, including means sensing the line switches are closed, with said enabling means being responsive to the line switches being closed.

9. The control apparatus of claim 6, with said predetermined relationship being that the sensed second voltage energization is equal to or greater than the sensed first voltage energization.

10. The control apparatus of claim 6, including means for sensing that each of the sensed first and second voltage energizations are greater than a reference voltage energization, with said enabling means being responsive to the first and second voltage energizations being greater than the reference voltage energization.

* * * * *